July 24, 1962  T. D. NATHAN  3,046,028
GASKET AND USE THEREOF
Filed Dec. 1, 1959
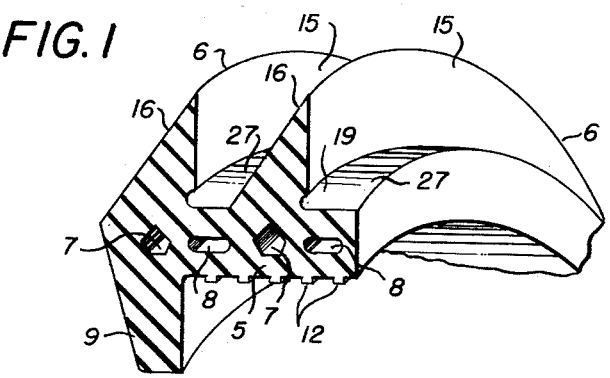
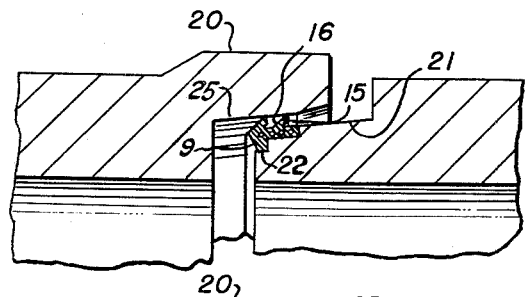
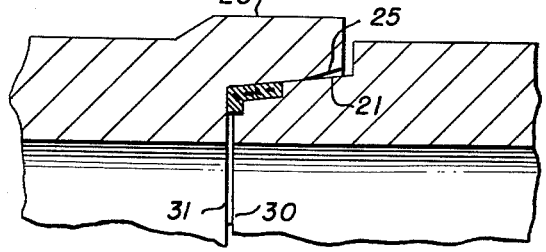
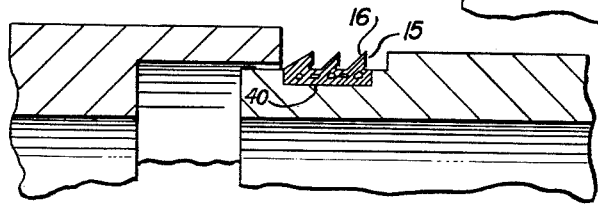
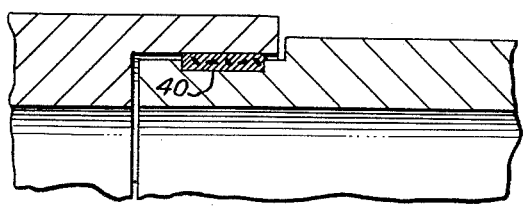
INVENTOR.
TRACY D. NATHAN
BY
*Gordon C. Mack*
ATTORNEY

United States Patent Office 3,046,028
Patented July 24, 1962

3,046,028
GASKET AND USE THEREOF
Tracy D. Nathan, Cuyahoga Falls, Ohio, assignor to Hamilton Kent Manufacturing Company, Kent, Ohio, a corporation of Ohio
Filed Dec. 1, 1959, Ser. No. 856,418
12 Claims. (Cl. 277—208)

This invention relates to a flexible, elastomeric gasket made of rubber or the like, designed primarily to form a seal between the ends of two pieces of concrete sewer pipe or the like.

An end of one of the pieces of pipe fits into an end of the other piece, and the gasket forms a tight seal between them. Obviously the pipes need not be concrete, and they need not be sewer pipes.

The gasket can take either of two forms. In one form the gasket is provided with a flange which hooks over the end of the inner pipe, and in the other form there is no such flange. The pipe may be recessed to receive either gasket; the flanged gasket may lie on the outer surface of the pipe.

Gaskets designed for use between telescoping pipe ends are well known. They are formed with a generally cylindrical body and parallel ribs which extend outwardly from the body. These ribs are preferably tapered outwardly, and when the ribs are pressed over, as the pipe ends are being telescoped, they lie relatively flat against the body portion of the gasket.

To facilitate distortional flow of the gasket material as the ribs are pressed against the body, enclosed openings have been provided in the body portion of the gasket, but no openings have been provided below the base of the respective ribs. It has now been found that it is advantageous to provide separate enclosed openings in the body of the gasket below the rib bases. The space between each of these openings below the base of the ribs and the nearest opening between the ribs, becomes a post or pillar providing a firmer final "pack" to the gaskets. Although these openings below the base of the ribs may be of any shape, they are preferably much narrower than the respective rib bases and are tapered outwardly, and in a preferred form they are generally in the shape of a tear drop. Their corners may be rounded or angular. Such openings increase the ease with which the gaskets are assembled with the pipes and facilitate initial flexing of the ribs; and the openings in the body portion of the gasket between the ribs facilitate distortional flow of the body of the gasket when the ribs are pressed against it. It is important that the openings be of such size, shape and location that they will not trap air under pressure when the gasket is compressed. In this design the distortional flow of the rubber changes the holes to long narrow slits of similar volume. The combination of openings contemplated by this invention facilitates the formation of a tighter seal between the two pipes, this seal being generally rectangular in cross section.

The ends of the pipes may be provided with bells and spigots, or they may be provided with tongues and grooves, or the ends may be joined by a ball assembly, smooth or recessed. The gasket may lie on the outer surface of the inner pipe portion or it may be recessed into the outer surface of the inner pipe. In the flanged type of gasket, the flange is caught over the end of the inner pipe. This end surface may be flat or stepped.

The invention will be further described in connection with the accompanying drawings, in which—

FIG. 1 is a sectional view, in perspective, of the gasket;
FIG. 2 is a section of a gasket with a flanged end in an open bell and spigot joint;
FIG. 3 is a view of the same with the joint closed;
FIG. 4 is a section of a gasket without a flange, recessed in the tongue of an open tongue and groove joint; and
FIG. 5 is a section of the same with the joint closed.

The gasket has a generally cylindrical body 5, ribs 6 and openings 7 and 8 in its body portion. There are at least two ribs and there may be any small plural number such as four or five. The gasket is provided with the flange 9.

The gasket is preferably formed by extruding a continuous length of the gasket material from natural rubber, neoprene, or other elastomer, cutting this to length, and then uniting the cut ends in any suitable manner. If the elastomer is extruded from a curable stock, the ends are preferably united before curing.

The body portion 5 is generally cylindrical and fits against the outer surface of a pipe at or near its end. This pipe surface may be cylindrical or it may taper gradually inward toward the pipe end. If the gasket is flanged the flange fits over the end of the pipe. The pipe is preferably recessed to receive the gasket, although the flanged gasket may be placed over an unrecessed portion of the pipe. The undersurface of the gasket may be scored at 12, but this is not necessary. Scoring is particularly desirable on an unflanged gasket to prevent slippage on the surface of the pipe as the pipe ends are telescoped one into the other.

As shown in FIGURE 3, the surface of the pipe to which the gasket is applied may taper. Alternatively, it may be cylindrical. The taper is not great, and a cylindrical gasket will lie flat on it and make a tight fit with it. Whether cylindrical or slightly tapered, the gasket is referred to herein as being generally cylindrical.

The ribs 6 taper outwardly and they taper toward one edge of the gasket which, if the gasket is flanged, is the edge opposite the flanged edge.

In the preferred gasket, whether flanged or unflanged, the surfaces 15 of the ribs which are pressed into contact with the body portion 5 of the gasket, are substantially perpendicular to the axis of the body of the gasket. The other surface 16 of the ribs slants from the body portion toward this surface 15, and the outer end of the rib may be pointed or blunt or rounded. The inner surface 15 of each rib is preferably undercut at 19 a very slight distance to facilitate the flexing of the ribs toward the body portion of the gasket. The undercut may be a half round.

Most gaskets resist packing and tend to push back up the spigot as the pack is made. This design, because the fins are flexibly hinged, tends to push the gasket tightly against the spigot as the pack is made, thus securing it firmly in position.

FIGURES 2 and 3 show the use of a flanged gasket in the joint between two pipe ends, one of the pipes being formed with the bell 20 and the other with the spigot 21.

In the drawing, the flange is shown as fitting against the end of the spigot which is recessed at 22 to accommodate the flange. The step 22 is not necessary because the end of the spigot may be sheer, in which case the flange fits against the end of the spigot instead of into a recess.

The spigot is shown as tapering, but it may be cylindrical.

FIGURE 2 shows the bell and spigot joint as open with the inner surface 25 of the bell barely touching the outer ends of the ribs. As the bell is forced over the spigot the ribs are flattened against the body portion of the gasket. The undercut 19 causes the ribs to flex generally along the line of joinder of the ribs with the body portion. The perpendicular surface 15 is flattened against the generally cylindrical outer surface 27 of the body portion of the gasket.

As the ribs are flattened there is torsional flow of the rubber and the openings 7 tend to disappear. By tapering the openings 7 outwardly they tend to flatten most readily. By providing an opening immediately below the base of each rib, provision is made for the flow of elastomer caused by the flattening of the rib, and the elastomer surrounding the undercut 19 readily gives way, moving toward the opening 7 and substantially closing it.

It is important that the openings 7 be separate from the openings 8. If they opened into one another there would be no support for each edge of the base of each rib, and the ribs would not form as tight a seal as that provided here. As it is, the ribs are supported on each side of each opening 7. As the ribs are flattened they close as a hinge, and the material surrounding the undercut 19 is pressed into the body portion of the gasket through the opening 7, and this flattens the opening. The openings 8 are preferably elongated but need not be.

As the ribs are pressed against the outer surface of the body portion of the gasket, the openings 8 which are preferably elongated and generally cylindrically shaped, flatten out. Thus, as the two pieces of pipe are telescoped—one into the other—the wall 25 of the bell (FIG. 2) advances toward the wall 21 of the spigot, and the ribs 6 are flattened against the body portion of the gasket. This flattens the openings 8, and the flexing of the base of each rib causes the opening beneath it to flatten at an angle which approaches the perpendicular. As a consequence, the outer surface of the compressed gasket assumes an almost level, flat shape.

FIGURE 3 shows the pipes brought together with the gasket forming a tight seal between them. The gasket not only forms a tight seal between the surfaces 21 and 25 of the ends of the pipe, but also between the two ends 30 and 31 of the pipe if these are not forced into contact with one another. Unless the end of the one pipe is recessed to receive the gasket, it is impossible to bring it into contact with the other pipe. The depth of the recess and thickness of the flange determine whether contact is made.

The gasket of FIGURES 4 and 5 is not flanged. It is made with three ribs instead of two. It is located in the recess 40 in the pipe which is preferably formed in the surface of the pipe as the pipe is cast. For instance, it may be formed with a split metal ring which is later removed from the surface of the pipe. As the two pipes are brought together the ribs are flattened to form the substantially rectangular seal shown in FIGURE 5, just as the ribs of the gasket of FIGURES 2 and 3 are flattened.

The openings in the body portion of the gasket of FIGURES 4 and 5 are as important as those in the flanged gasket shown in the earlier figures and they serve the same purpose. The flange 9 of FIGURE 1 has little, if any, operational relation with the opening 7 nearest it. It is primarily the folding action of the outer rib 6 that closes this opening, and this action is the same whether the gasket is flanged as shown in FIGURE 1, or whether it is unflanged as shown in FIGURES 4 and 5.

Packing may be used in joints of this type but it is not necessary. The exact shape of the telescoping surfaces of the pipe ends is unimportant.

The invention is covered in the claims which follow.

What I claim is:

1. An elastomeric gasket with a generally cylindrical body portion, a small plurality of ribs encircling the outer surface of the body portion in parallel relation, the major portion of the inner surface of the gasket extending inwardly from one edge of the gasket being adapted to rest on a flat surface and substantially in contact therewith, each of said ribs tapering outwardly and all of the ribs being adapted to be flattened toward only said edge of the gasket, with an enclosed opening in the body portion between each two ribs and a separate enclosed opening in the body portion below the base of each rib.

2. The combination of a first and second pipe with an end of the first pipe telescoped in an end of the second pipe, with the gasket of claim 1 forming a seal between their telescoped ends, the gasket being under pressure with the inner surface of the body portion of the gasket against the outer surface of a telescoped portion of the wall of the first pipe and the inner surface of a telescoped portion of the second pipe pressing the ribs of the gasket against the outer surface of the body portion of the gasket and at least almost completely flattening the openings in the body portion, the body portion of the gasket between the openings therein forming a post under each edge of each rib providing a firm pack to the gasket.

3. The gasket of claim 1 which includes an inwardly directed flange near the opposite edge of the gasket and opposed to the rib nearest said edge with one of said openings between said flange and said rib, the inner wall of the flange being substantially in a plane perpendicular to the axis of the body portion.

4. The combination of a first and second pipe with an end of the first pipe telescoped in an end of the second pipe, with the gasket of claim 3 forming a seal between their telescoped ends, the gasket being under pressure with the inner surface of the body portion of the gasket against the outer surface of a telescoped portion of the wall of the first pipe and the inner surface of a telescoped portion of the second pipe pressing the ribs of the gasket against the outer surface of the body portion of the gasket and at least almost completely flattening the openings in the body portion, the flange of the gasket overlying the telescoped end of the first pipe, the body portion of the gasket between the openings therein forming a post under each edge of each rib providing a firm pack to the gasket.

5. The gasket of claim 1 in which each opening below a rib tapers outwardly.

6. The combination of a first and second pipe with an end of the first pipe telescoped in an end of the second pipe, with the gasket of claim 5 forming a seal between their telescoped ends, the gasket being under pressure with the inner surface of the body portion of the gasket against the outer surface of a telescoped portion of the wall of the first pipe and the inner surface of a telescoped portion of the second pipe pressing the ribs of the gasket against the outer surface of the body portion of the gasket and at least almost completely flattening the openings in the body portion, the body portion of the gasket between the openings therein forming a post under each edge of each rib providing a firm pack to the gasket.

7. The gasket of claim 1 in which that wall of each rib which is toward said edge of the gasket is in a plane substantially perpendicular to the axis of the body portion and is slightly undercut at its base.

8. The combination of a first and second pipe with an end of the first pipe telescoped in an end of the second pipe, with the gasket of claim 7 forming a seal between their telescoped ends, the gasket being under pressure with the inner surface of the body portion of the gasket against the outer surface of a telescoped portion of the wall of the first pipe and the inner surface of a telescoped portion of the second pipe pressing the ribs of the gasket against the outer surface of the body portion of the gasket and at least almost completely flattening the openings in the body portion, the body portion of the gasket between the openings therein forming a post under each edge of each rib providing a firm pack to the gasket.

9. The gasket of claim 1 in which that wall of each rib which is toward said edge of the gasket is in a plane substantially perpendicular to the axis of the body portion and is slightly undercut at its base, the opening below the base of each rib tapering outwardly.

10. The combination of a first and second pipe with an end of the first pipe telescoped in an end of the second pipe, with the gasket of claim 9 forming a seal between their telescoped ends, the gasket being under pressure with the inner surface of the body portion of the gasket against the outer surface of a telescoped portion of the wall of the first pipe and the inner surface of a telescoped portion of the second pipe pressing the ribs of the gasket against the outer surface of the body portion of the gasket and at least almost completely flattening the openings in the body portion, the body portion of the gasket between the openings therein forming a post under each edge of each rib providing a firm pack to the gasket.

11. The gasket of claim 1 in which that wall of each rib which is toward said edge of the gasket is in a plane substantially perpendicular to the axis of the body portion and is slightly undercut at its base, with a flange extending inwardly at the opposite edge of said gasket with the inner surface of said flange lying substantially in a plane perpendicular to the axis of said body portion.

12. The combination of a first and second pipe with an end of the first pipe telescoped in an end of the second pipe, with the gasket of claim 11 forming a seal between their telescoped ends, the gasket being under pressure with the inner surface of the body portion of the gasket against the outer surface of a telescoped portion of the wall of the first pipe and the inner surface of a telescoped portion of the second pipe pressing the ribs of the gasket against the outer surface of the body portion of the gasket and at least almost completely flattening the openings in the body portion, the flange of the gasket overlying the telescoped end of the first pipe, the body portion of the gasket between the openings therein forming a post under each edge of each rib providing a firm pack to the gasket.

References Cited in the file of this patent

UNITED STATES PATENTS

| | | |
|---|---|---|
| 2,032,492 | Nathan | Mar. 3, 1936 |
| 2,156,681 | Dewhirst et al. | May 2, 1939 |
| 2,259,940 | Nathan | Oct. 21, 1941 |
| 2,271,777 | Nathan | Feb. 3, 1942 |
| 2,615,740 | Nathan | Oct. 28, 1952 |
| 2,896,974 | Bush | July 28, 1959 |

FOREIGN PATENTS

| | | |
|---|---|---|
| 969,871 | France | May 31, 1950 |
| 812,501 | Germany | Sept. 3, 1951 |